Aug. 20, 1929.  W. G. FRANKE ET AL  1,724,999
CONDUIT OUTLET BOX
Filed Dec. 15, 1926
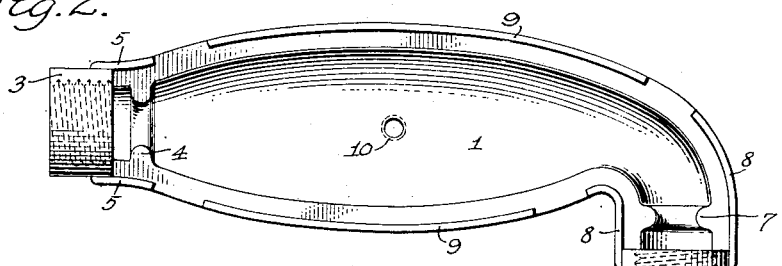
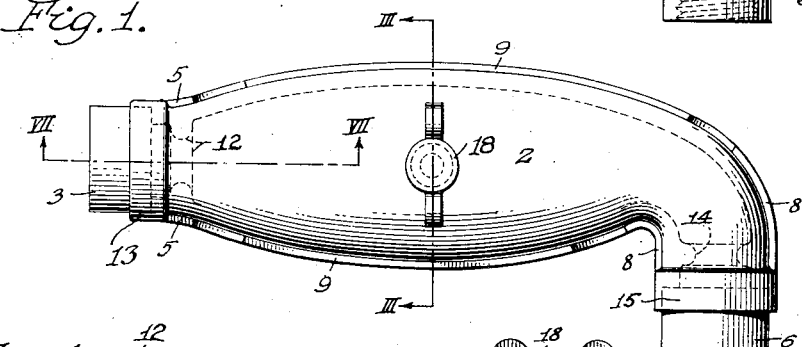
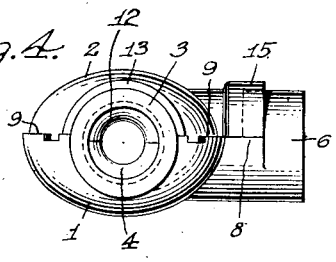
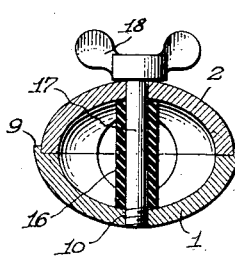
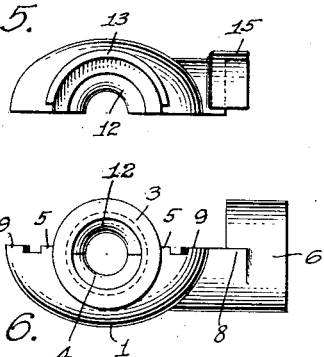
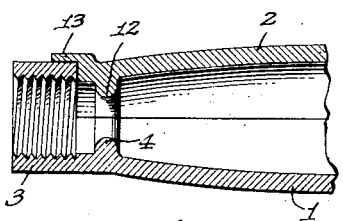
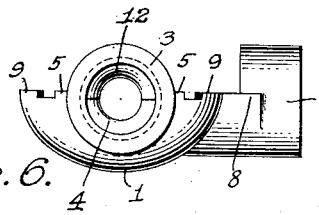
Inventors
William G. Franke,
Leo A. Reiner,
By
Attorneys Patented Aug. 20, 1929.

1,724,999

UNITED STATES PATENT OFFICE.

WILLIAM G. FRANKE AND LEO A. REINER, OF DETROIT, MICHIGAN.

CONDUIT-OUTLET BOX.

Application filed December 15, 1926. Serial No. 154,930.

This invention relates to a conduit outlet box and has special reference to that class of boxes of which the Franke Patent No. 1,456,792 dated May 29, 1923, discloses a fair example, the box consisting of two parts detachably connected together with one of said parts normally stationary and the other adapted to be detached to permit of easy access being had to conductors or electrical connections within the box.

Our invention aims to provide a two part outlet box wherein novel means are employed for correctly positioning a movable part of the box relative to a stationary part thereof and securing the two parts together against accidental displacement.

Our invention further aims to provide a strong and durable conduit outlet box composed of parts that may be easily molded, and the detail construction of such parts will be hereinafter specifically described and then claimed.

Reference will now be had to the drawing, wherein

Figure 1 is a side elevation of the conduit outlet box;

Fig. 2 is a similar view of the stationary member of the box;

Fig. 3 is a cross sectional view of the box taken on the line III—III of Fig. 1;

Fig. 4 is an end view of the conduit outlet box;

Fig. 5 is an end view of the movable member of the box;

Fig. 6 is a similar view of the stationary member of the box, and

Fig. 7 is a longitudinal sectional view taken on the line VII—VII of Fig. 1.

The conduit outlet box is composed of a stationary member 1 and a movable member 2, said members when placed together providing an oblong or bulb-like enclosure in which electrical wires may be connected and the connections maintained without any danger of disconnection or interference when the members of the box are connected together.

The stationary member 1 has one end thereof formed with an integral interiorly screwthreaded sleeve 3 and adjacent said sleeve is an interior semi-circular flange 4 and opposed end flanges 5. The opposite end of the member 1 may be disposed at an angle relative to the major axis of said member and this angular end is formed with a sleeve 6, and interior flange 7, and end flanges 8, all of which are similar to corresponding elements at the opposite end of the stationary member. In spaced relation to the end flanges 5 and 8 are side flanges 9 and centrally of the side wall of the stationary member 1 is an opening 10 having its walls screwthreaded.

The greater part of the stationary member 1 provides an open side adapted to be closed by the detachable or movable member 2 having its longitudinal edges seated on the edges of the stationary member 1 with the end and side flanges 9 preventing lateral displacement of the detachable member 2 relative to the stationary member 1. One end of the detachable member 2 is formed with an interior flange 12 to cooperate with the flange 4 of the member 1 in forming an interior collar, and this same end of the detachable member 2 is formed with an overhanging semi-cylindrical positioning flange 13 adapted to extend on to the sleeve 3 and form a liquid shedding joint between the members 1 and 11 at this end of the box.

The opposite end of the detachable member 2 is angular to correspond with an angular end of the member 1 and is formed with an interior flange 14 and cooperates with the flange 7 in forming a collar for this end of the box. There is also a semi-cylindrical overhanging flange 15 to fit on the sleeve 6 and provide a liquid shedding joint for this end of the box. The flanges 5, 8, 9, 13 and 15 insure proper fitting of the detachable member on the stationary member.

The stationary and detachable members provide an enclosure having a middle portion oval in cross section and in this middle portion of the box is placed a sleeve insulator 16 through which extends a screw bolt 17 mounted in the opening 10 and provided with a head 18 to facilitate rotation of the screw bolt. The adjoining members 1 and 11 will be clamped together with the various flanges preventing displacement of the detachable member relative to a stationary member. The configuration of the box affords plenty of space at the sides of the transverse connecting member for wires and wire fixtures.

In the Franke patent above referred to apertured lugs and nut equipped screws have been shown for connecting the fixed members together and in some instances such fastening means may be used in connection with our box. Again, the Franke patent discloses a branch and it is obvious that one or more such branches may be used by us to afford a plurality of outlets.

One embodiment of our invention has been illustrated, but it is to be understood that the structural elements are susceptible to such variations as are permissible by the appended claims.

What we claim is:—

1. A conduit outlet box comprising a stationary member having an open side and integral sleeve ends, a detachable imperforate member mounted on the open side of said stationary member and provided with semi-cylindrical flanges overlapping the sleeve ends of said stationary member, one of said ends being bent sharply at right angles to the longitudinal axis of said stationary member, and means connecting said stationary and detachable members together, said means being disposed transversely of the middle portions of said stationary and detachable members.

2. A conduit outlet box comprising a stationary member having an open side and integral sleeve ends, a detachable imperforate member mounted on the open side of said stationary member and provided with semi-cylindrical flanges overlapping the sleeve ends of said stationary member, one of said ends being bent sharply at right angles to the longitudinal axis of said stationary member, means connecting said stationary and detachable members together, and interior end flanges in said members cooperating in providing collars adjacent the sleeve ends of said stationary member.

In testimony whereof we affix our signatures.

WILLIAM G. FRANKE.
LEO A. REINER.